March 28, 1950  J. G. OETZEL  2,501,959

FRICTION BRAKE ANCHOR CONSTRUCTION

Filed Dec. 7, 1944  3 Sheets-Sheet 1

INVENTOR
John George Oetzel
BY Carlson, Pitzner, Hubbard & Wolfe
ATTORNEYS

March 28, 1950     J. G. OETZEL     2,501,959

FRICTION BRAKE ANCHOR CONSTRUCTION

Filed Dec. 7, 1944     3 Sheets-Sheet 2

INVENTOR
John George Oetzel
BY Carlson, Pitzner, Hubbard & Wolfe
ATTORNEYS

March 28, 1950 J. G. OETZEL 2,501,959
FRICTION BRAKE ANCHOR CONSTRUCTION
Filed Dec. 7, 1944 3 Sheets-Sheet 3
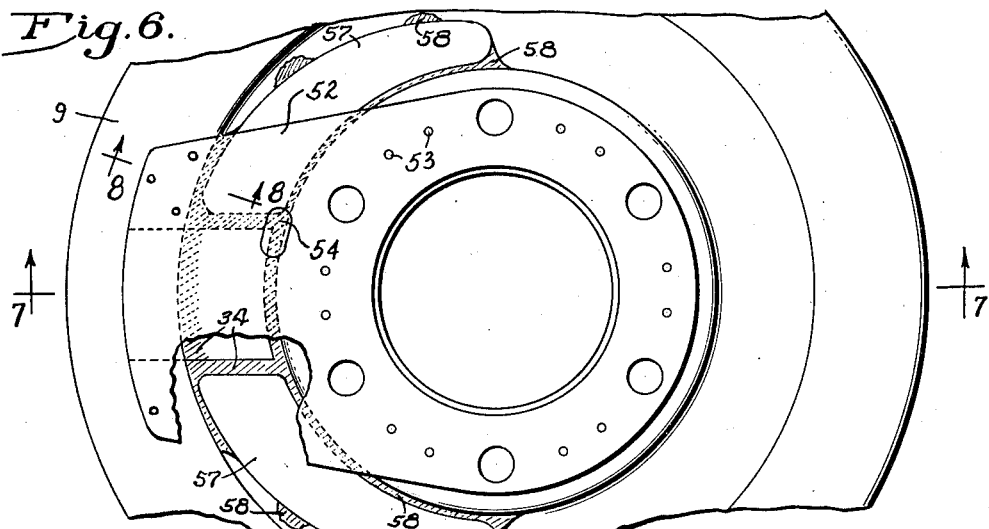
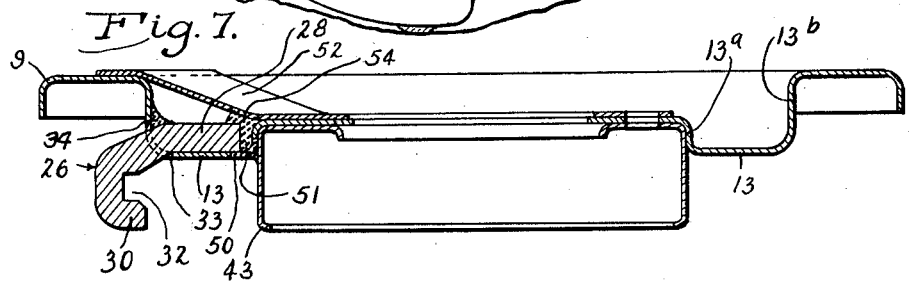
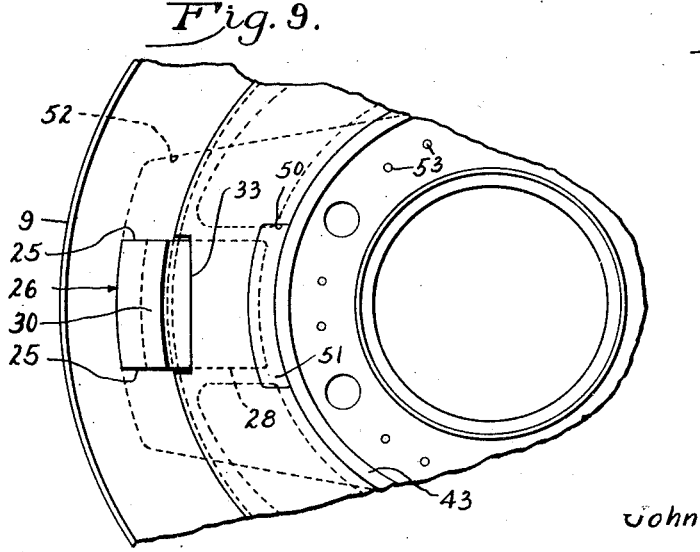
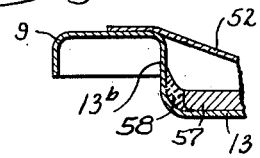
INVENTOR
John George Oetzel
BY *[signature]*
ATTORNEYS Patented Mar. 28, 1950

2,501,959

UNITED STATES PATENT OFFICE 2,501,959

FRICTION BRAKE ANCHOR CONSTRUCTION

John George Oetzel, Beloit, Wis., assignor to Warner Electric Brake Manufacturing Company, South Beloit, Ill., a corporation of Illinois Application December 7, 1944, Serial No. 567,005

16 Claims. (Cl. 188—78)

1

This invention relates to an anchor construction in a friction brake, particularly of the internal expanding type adapted for use with a drum carried by a vehicle wheel.

The primary object is to provide, for a brake mechanism of the above character, a novel anchor construction which is simple and inexpensive to manufacture, which is of rugged structure, which permits of low cost manufacture, and which provides a high degree of radial compactness of the brake elements and actuator parts.

A more detailed object is to provide an anchor member which projects through the closure plate for the brake drum and is secured to such plate exteriorly of the latter.

A further object is to combine said anchor construction with a novel brake actuator.

Another object is to provide a novel construction of the ends of the friction element in a brake mechanism of the above character.

Still another object is to center the expansible friction element in a novel way.

Other objects and advantages of the invention will become apparent from the following detailed description taken in connection with the accompanying drawings, in which Figure 1 is a diametrical sectional view of a brake mechanism embodying the novel features of the present invention, the section being taken along the line 1—1 of Fig. 2.

Fig. 6 is a fragmentary face view taken from the exterior of the drum closure plate and showing a modified mounting of the anchor.

Figure 1:
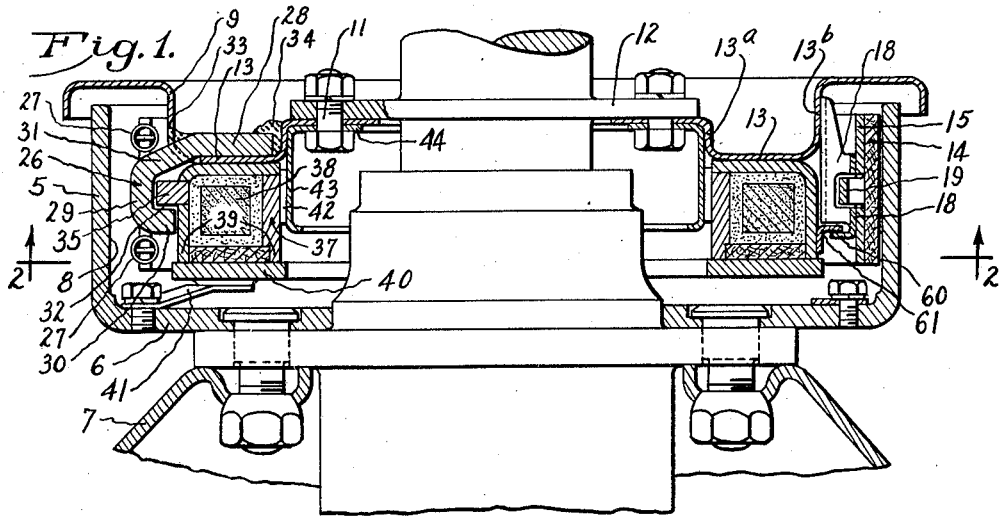

Figs. 7 and 8 are sections taken along the lines 7—7 and 8—8 of Fig. 6.

Fig. 9 is a fragmentary face view taken from the interior of the modified closure plate.

While the invention is susceptible of various modifications and alternative constructions, I have shown in the drawings and will herein describe in detail the preferred embodiment. It is to be understood, however, that I do not intend to limit the invention by such disclosure, but aim to cover all modifications and alternative constructions falling within the spirit and scope of the invention as expressed in the appended claims.

The brake mechanism shown for purposes of illustration is adapted for use in a drum 5 having an inturned flange 6 bolted to the vehicle wheel 7 or other part to be braked and having an internal cylindrical surface 8. With the improved brake mechanism mounted in the drum, the open end of the latter is closed by a plate 9 comprising a sheet metal stamping whose inner peripheral edge portion is clamped by bolts 11 against an axle flange 12 or other nonrotatable part. To impart rigidity to the plate, a portion 13 intermediate the peripheral margins is depressed inwardly to form an annular bead projecting into the drum and having generally cylindrical side walls 13$^a$ and 13$^b$ and a flat end.

The braking action is produced by expanding segments 14 of friction material against the drum surface 8. In this instance, the segments are arranged in end-to-end relation and carried by a band 15 which is supported at angularly spaced points by members 17 and 18 on the anchor plate and is centered axially relative to the drum by coaction between the member 18 and a rib 19 struck out of the band. The ends of the band are spaced apart on one side of the drum and reinforced by ribs 20 extending along the center lines of the band ends on the inner surface of the latter. Sheet metal members 21 which are substantially triangular in the present instance, straddle the ends of the ribs 20. Their ends 22 lie against and are welded to opposite sides of the rib 20. The intermediate portions 23 abut against the ends of the ribs 20 and provide opposed circumferentially spaced end faces 24 which are adapted for abutment with opposite sides 25 of an anchor 26. Springs 27 stretched between the ends of the band 15 normally hold the end faces 24 of the band against the abutment surfaces 25.

The anchor 26 is constructed specially to provide a high degree of radial compactness of the parts while at the same time possessing substantial rigidity in spite of the comparatively light construction of the closure plate 9. In the form shown in Figs. 1 to 5, it comprises a generally J-shaped piece of metal substantially straight at one end 28 and bent at the other end to form the anchor proper which is generally U-shaped and opens inwardly, being composed of a short intermediate portion 29, a flange 30 extending substantially at right angles to the portion 29, and a connection 31 between the portion 29 and the straight portion 28. The inclined portion 31 projects through a hole 33 punched in the outer side wall of the depression in the closure plate 9, and the portion 28 lies against the flat bottom 13 of the depression. Metal 34 is applied by welding around all sides of the portion 28 and secures the latter firmly to the depressed surface 13, so that an extremely rigid mounting is provided for the U-shaped anchor proper whose two faces 25 are each divided into two parts axially spaced apart and thus provide large widely spaced areas of abutting engagement with the shoe ends 24.

In the present instance, the shoe ends 24 are spread apart by circumferential movement in one direction or the other of a lug 35 which is mounted to move circumferentially in the groove 32 of the anchor member 26. Opposite side surfaces 36 on the lug abut against the end surfaces 24 of the band over areas disposed within the effective areas 25 of the anchor. The lug projects outwardly and radially from and is rigidly welded to a magnet ring 37 of generally U-shaped cross section having an energizing coil 38 disposed between its concentric poles 39 which are spanned by a flat armature ring 40. The latter may be supported from the drum flange 6 through the medium of spring arms 41 that maintain continuous light mechanical contact between the armature and the friction face of the magnet ring.

Herein, the magnet is backed by the flat end portion 13 of the closure plate 9 and is supported for oscillation about the drum axis by a bearing 42 carried by a sheet metal cylinder 43 having an inturned flange 44 which is clamped by the bolts 11 against the closure plate 9. Springs 45 stretched between a lug 59 on the magnet periphery and parts 46 on the inner surface of the band 15 serve to return the magnet to brake-released position. Since the lug moves circumferentially of the groove in the anchor 26, the actuating force is applied along the center line of the band the same as are the reactionary forces exerted by the anchor 26 on the band ends.

The magnet ring is held against the bead 13 by the inwardly projecting portion 30 of the anchor and by a flange 60 (Fig. 1) on the centering member 18 coacting with a lug 61 projecting outwardly from the magnet. The end portions of the band are centered relative to the drum through the medium of the magnet ring, this being accomplished by pairs of lugs 63 projecting from the outer periphery of the magnet and straddling the reinforcing ribs 20 on the band.

For certain brake installations, it is desirable to further strengthen the mounting of the anchor and reinforce the side of the drum closure plate supporting the anchor. This may be accomplished as illustrated in Figs. 6 to 9 by forming an arcuate hole 50 in the closure plate 9 at the junction between the portion 13 and the inner side wall 13ª and welding a metal filling 51 in this hole to connect the end of the anchor part 28 to the cylinder 43 over an arc of substantial length. The cylinder is thus utilized to reinforce the closure plate.

To form the sector of the plate 9 supporting the anchor member 26 into a rigid truss structure, the depression in the plate is spanned by a plate 52 having a hub portion lying against and secured to the central part of the plate 9 as by spot welds 53 and by metal 54 welded into holes in the reinforcing plate. The plate 52 projects outwardly across the depression and is secured to the outer part of the plate 9 by spot welds. The plates 9 and 52, the anchor leg 28 and the cylinder 43 are thus tied together to form a rigid truss structure which provides an extremely rugged support for the anchor proper.

Any tendency of the anchor 26 to twist the plate 9 due to the fact that it overhangs the thin section 13 thereof may be overcome by providing flat pieces 57 of metal lying against the portion 13 and extending from points adjacent the anchor part 28 around substantial arcs. These pieces are of relatively thick stock and narrower than the groove so as to leave space at opposite sides for welded metal 58 by which the margins of the pieces are made rigid with the portions 13ª and 13ᵇ.

Figure 2:
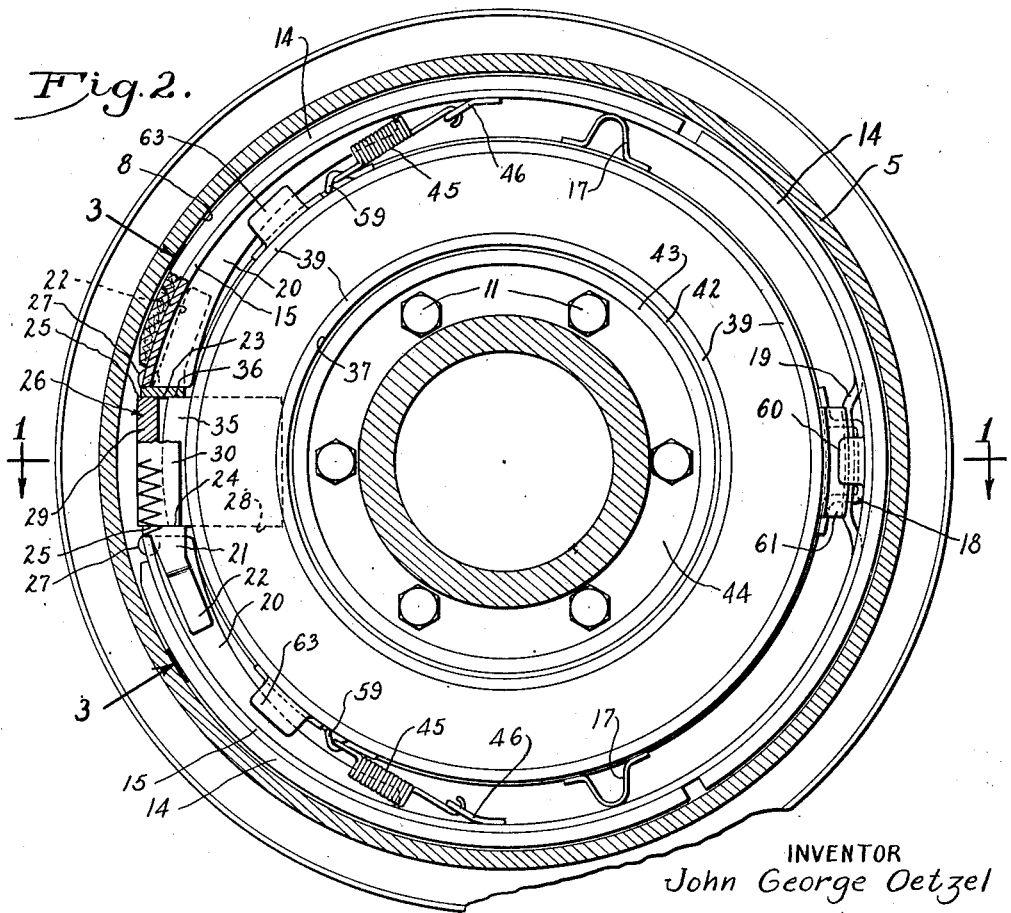
Fig. 2 is a section taken along the line 2—2 of Fig. 1.
Figure 3:
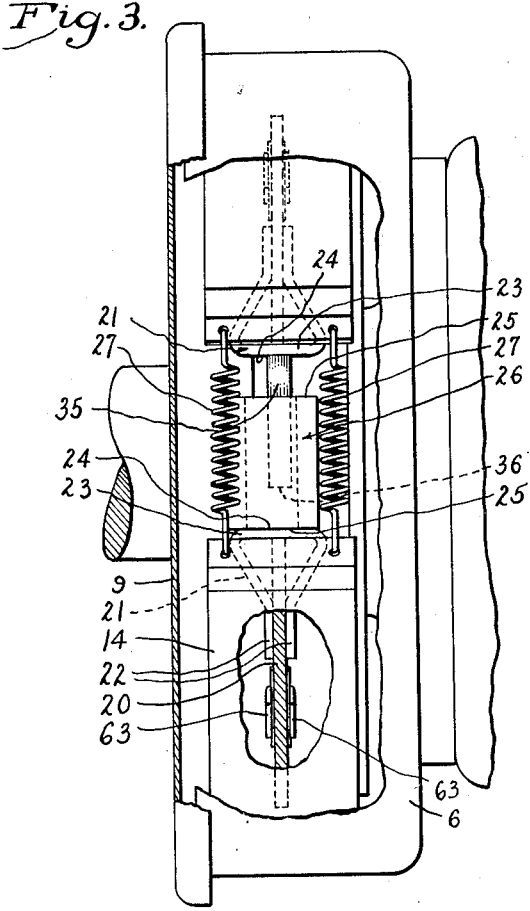
Fig. 3 is a sectional view taken along the arcuate line 3—3 of Fig. 2, the parts being shown in actuated positions.
Figure 4:
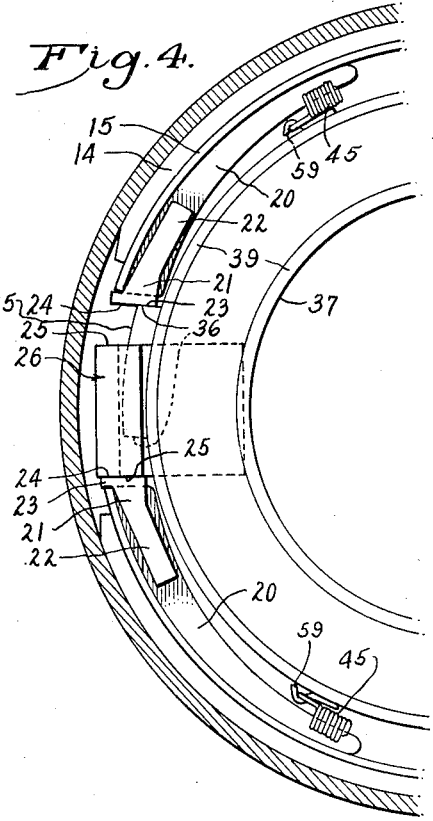
Fig. 4 is a fragmentary view of a portion of Fig. 2 with the parts in actuated positions.
Figure 5:
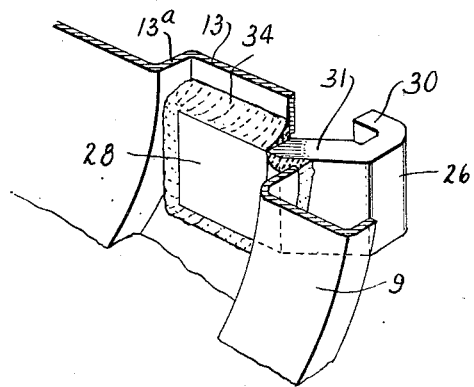
Fig. 5 is a fragmentary perspective view of the anchor member and a portion of its support.

The brake mechanism above described is released when the parts are positioned as shown in Fig. 2. When the magnet is energized with the drum rotating in a clockwise direction, the friction face of the magnet grips the rotating armature 40 and turns with the drum carrying one end 24 of the brake band away from the anchor 26 so as to expand the friction element against the drum as shown in Fig. 4, the other band end remaining anchored. The magnet then slips relative to the armature, and a retarding force continues to be applied to the drum as long as the magnet remains energized. Upon deenergization, the magnet and the actuated band end are returned to released position by the springs 27 and 45.

It will be observed that with the construction above described, the mounting for the anchor 26 is disposed outside of the closure plate 9, and the actuating lug 35 requires no additional radial space. As a result, the magnet ring may be disposed immediately within the band 15 so that the overall dimensions of the brake mechanism both radially and axially are reduced to a minimum. At the same time, the anchor 26 straddles the actuating lug 35 so that both actuating and anchoring forces are centered with respect to the band.

I claim as my invention:

1. A friction brake mechanism having, in combination, a friction element providing an external gripping surface expanded by separation of the ends of the element, a plate on one side of said element depressed to form an annular groove axially facing away from said element, a radially disposed member having its inner end portion projecting through the outer side wall of said groove and secured against the outer surface of said plate at the bottom of said groove, the outer end portion of said member being curved and projecting from said plate inwardly between said element ends to provide anchors therefor and to form an inwardly opening circumferentially extending recess, a ring mounted to oscillate about the axis of said friction element, and an actuating lug rigid with and projecting outwardly from said ring into said recess, said lug moving circumferentially through the recess to move one or the other of said element ends away from its anchor 2. A friction brake mechanism having, in combination, an annular friction element having circumferentially spaced ends, movable toward and away from each other to contract and expand the element, a plate on one side of said element, an actuating projection disposed between said ends and bodily movable circumferentially in an arcuate path about the axis of said friction element and in either direction away from a normal brake-released position whereby to expand the element, and an anchor secured to said plate and projecting outwardly and around said projection so as to straddle the latter and said path and provide two pairs of abutment surfaces engaging said element ends at a radius substantially equal to that of said path.

3. A friction brake mechanism having, in combination, an expansible annular friction element having circumferentially separable ends, a U-shaped anchor disposed between said ends and defining between its legs and inwardly opening recess extending circumferentially, and an actuating member projecting into said recess and bodily movable circumferentially through the latter along an arc concentric with the center of said friction element whereby to shift one or the other of said ends away from said anchor.

4. A friction brake mechanism having, in combination, an expansible friction element having separable ends, a plate adjacent said element and having a flat bottomed annular depression formed therein within said band, a generally J-shaped member having a curved end portion disposed on the inner side of said plate between said ends to provide anchors therefor and a straight end projecting through said plate and secured against the bottom of the depression, and means movable through the recess in said curved end portion to spread said element ends apart.

5. A friction brake mechanism having, in combination, an annular friction element having circumferentially separable ends, a plate adjacent said element having a flat bottomed depression formed therein adjacent said ends and facing axially away from the element, a member having an end portion disposed between said ends to provide anchors therefor and another end portion projecting inwardly and radially through the outer side wall of said depression and secured against the bottom surface of the depression, and means for spreading the ends apart.

6. An anchor for a friction brake comprising an annular plate, and a radially disposed member projecting radially through said plate intermediate the ends of the member with the inner end portions of the member lying flat against one side of the plate and secured thereto, the outer end of said member being bent laterally away and projecting from the opposite side of the plate to provide two pairs of circumferentially facing anchor abutments with the abutments of each pair spaced apart axially.

7. For a friction brake, the combination of a drum closure plate having a flat bottomed annular depression concentric with and disposed between its inner and outer peripheral edges, and a generally J-shaped member having its straight end portion secured against the bottom of said depression and its curved end portion extending radially through the outer side wall of said depression and then laterally and away from the plate.

8. An anchor for a friction brake, comprising an annular plate having an axially facing depression therein radially spaced from the plate axis, and an integral one piece member having one end portion lying flat against and secured to the bottom of said depression and its other end portion extending radially and outwardly through the outer side wall of said depression and then laterally and away from the plate, the sides of said last mentioned end portion providing circumferentially facing abutment surfaces.

9. In a friction brake mechanism, the combination of a drum closure plate having an annular bead projecting from one side thereof and defining a depression on its other side, a cylinder fitting within and projecting beyond said bead on the first mentioned side of said plate, a member having one end portion secured against the bottom of said depression and its other end portion projecting laterally through said plate to provide an anchor, and a weld extending through said plate and rigidly connecting said member and said cylinder.

10. In a friction brake mechanism, the combination of a plate having an annular bead projecting from one side of the plate and defining a depression on the opposite side, a member having one end portion secured against the bottom of said depression and the other end portion projecting laterally through the plate and beyond said bead to provide an abutment anchor, and reinforcing plates welded to the bottom of said depression and extending circumferentially in opposite directions from the first mentioned end portion of said member.

11. For use in a friction brake, the combination of a drum closure plate having a depression therein, a member having one end portion secured against the bottom of said depression and its other end projecting through said plate and from the other side of the plate to provide an anchor, and a plate bridging said depression and rigidly secured to said closure plate on opposite sides thereof.

12. For use in a friction brake, the combination of a drum closure plate having a depression therein, a member having one end portion disposed in said depression and welded to the side of said closure plate, the other end portion of said member projecting through a side wall of said depression and then laterally from the other side of said plate to provide an anchor, and a piece of metal bridging said depression adjacent said member and welded to said plate on opposite sides of the depression.

13. An anchor for a friction brake comprising a plate having an arcuate depression on one side thereof, a member having one end portion secured against the bottom of said depression and the other end portion projecting through the plate to provide an overhanging anchor on the side thereof, and reinforcing elements extending circumferentially around said depression in opposite directions from said member and rigidly secured against the bottom thereof.

14. An anchor for a friction brake comprising a plate having an arcuate depression on one side thereof, a member having one end portion secured against the bottom of said depression and the other end portion projecting through the plate to provide an overhanging anchor on the side thereof, and means extending circumferentially away from said member and secured to the bottom of said depression to reinforce said plate against twisting.

15. An anchor for a friction brake comprising a plate having an arcuate depression on one side thereof, a member having one end portion secured against the bottom of said depression and the other end portion projecting through the plate to provide an overhanging anchor on the side thereof, means extending circumferentially away from said member and secured to the bottom of said depression to reinforce said plate against twisting, and a plate spanning said depression adjacent said member and rigidly secured to said first plate on opposite sides of the depression.

16. A friction brake mechanism having, in combination, an expansible friction element having separable ends, a closure plate on one side of said element including a member for anchoring said ends of said element, a ring smaller than said element mounted to oscillate about the axis of the element and operable to spread said ends apart upon movement of the ring away from brake-released position, means for holding said ring against said closure plate as a backing while permitting free oscillation thereof, and interengageable members on said ring and the end portions of said friction element coacting to hold said end portions centered relative to the drum surface against axial movement in either direction while permitting circumferential spreading thereof by said ring.

JOHN GEORGE OETZEL.

REFERENCES CITED

The following references are of record in the file of this patent:

UNITED STATES PATENTS

| Number | Name | Date |
|---|---|---|
| 1,759,934 | Chanter | May 27, 1930 |
| 1,820,255 | Sneed | Aug. 25, 1931 |
| 1,945,245 | Whyte | Jan. 30, 1934 |
| 2,140,741 | Goepfrich | Dec. 20, 1938 |
| 2,284,485 | Farr et al. | May 26, 1942 |
| 2,293,710 | Cadman | Aug. 25, 1942 |
| 2,352,218 | Oetzel | June 27, 1944 |